(12) United States Patent
Ben-Dvora et al.

(10) Patent No.: US 7,317,681 B1
(45) Date of Patent: Jan. 8, 2008

(54) REDUNDANCY FOR DUAL OPTICAL RING CONCENTRATOR

(75) Inventors: Nir Ben-Dvora, Ramat Gan (IL); Doron Oz, Even Yehuda (IL); Roni Luxenberg, Ra'anana (IL); Assaf Ben-Amitai, Tel Aviv (IL)

(73) Assignee: Cisco Systems O.I.A. (1988)Ltd., Herzelia (IL)

( * ) Notice: Subject to any disclaimer, the term of this patent is extended or adjusted under 35 U.S.C. 154(b) by 1088 days.

(21) Appl. No.: 10/044,333

(22) Filed: Jan. 11, 2002

(51) Int. Cl.
*G01R 31/08* (2006.01)
(52) U.S. Cl. .................. 370/224; 370/222; 370/223
(58) Field of Classification Search ............... 370/224, 370/222, 223
See application file for complete search history.

(56) References Cited

U.S. PATENT DOCUMENTS 5,663,950 A * 9/1997 Lee et al. ................. 370/224

OTHER PUBLICATIONS

"Dynamic Packet Transport Technology and Performance", *Cisco Systems White Paper*, pp. 1-13, (2000).
"Enhanced Intelligent Protection Switching (E-IPS)", *Cisco Systems White Paper*, pp. 1-7, (2000).
"Spatial Reuse Protocol Technology", *Cisco Systems White Paper*, pp. 1-37, (2000).
Tsiang, D., et al., "The Cisco SRP MAC Layer Protocol", *RFC 2892*, pp. 1-43, (Aug. 2000).

* cited by examiner

*Primary Examiner*—Huy D. Vu
*Assistant Examiner*—Jason Mattis
(74) *Attorney, Agent, or Firm*—Schwegman, Lundberg & Woessner P.A.

(57) ABSTRACT

A novel and useful mechanism for optical ring networks providing concentrator redundancy in the event of a failure of a concentrator. The nodes in a network are connected to dual concentrators to form bi-directional dual counter-rotating optical rings. The failure of one of the concentrators is detected and the internal connections of the surviving concentrator are reconfigured to form a single ring that provides an alternate communication path thus preventing the collapse of the ring. Reliability of optical rings is improved by enabling the ring to continue to function in the event of a concentrator failure.

21 Claims, 8 Drawing Sheets

REDUNDANCY FOR DUAL OPTICAL RING CONCENTRATOR

FIELD OF THE INVENTION

The present invention relates generally to optical networks and more particularly relates to a redundancy scheme for use in dual optical ring networks employing at least two concentrators.

BACKGROUND OF THE INVENTION

The world is currently witnessing explosive growth in the demand for communications networks and systems and it is predicted that this demand will increase in the future. In particular, there is increased customer demand for IP-based applications, connectivity and services. In addition, there is much focus on the efficiency and scalability of IP-based optical networking infrastructures. As the demand for data services grows at an ever-increasing rate, meeting these demands requires communication networks having higher bandwidth capabilities and higher levels of reliability. In an effort to meet this demand, carriers must install facilities that are capable of carrying increasing amounts of data traffic and which are more resilient in the face of facility failures. Manufacturers of network equipment attempt to keep up with the demand by developing more reliable equipment that can handle higher bandwidths.

In addition, much of the new bandwidth capacity being installed nowadays by carriers includes optical fiber networks. In particular, optical networks based on the SONET and SDH standards are commonly being installed. SONET/SDH optical networks are often configured to operate as ring structures since these types of networks exhibit improved performance.

A diagram illustrating a prior art example of a dual optical ring network including four nodes is shown in FIG. 1. The ring network, generally referenced 10, comprises a plurality of network nodes 12 wherein each node is connected to its two neighbors via optical links. In the example shown herein, the ring network comprises four nodes labeled R1, R2, R3 and R4. Each node is connected to its neighbor via a dual optical links to form a bidirectional ring comprising two symmetric counter-rotating fiber rings 14, 16, each of which can be concurrently utilized to pass information and control packets. To distinguish between the two rings, one is referred to as the 'inner' ring 16 and the other as the 'outer' ring 14. In this case, each ring handles traffic in a single direction, i.e. clockwise traffic and counterclockwise traffic.

The creation of large ring networks containing ten or more nodes is difficult since connections must be made to neighbors on either side of a node. Once a ring network is established and configured, insertion and deletion of nodes typically becomes very problematic. To insert or delete a node, the ring must be broken and new connections established to maintain the integrity of the ring.

One solution to this problem is to use a concentrator that is in essence a network switching device whereby all the network devices (i.e. nodes) are connected in a physical star configuration to the concentrator. The concentrator emulates a ring structure internally by forwarding data from node to node around the ring via internal connections through the switch.

A diagram illustrating a prior art example of a plurality of network nodes connected to a concentrator configured to simulate the operation of a dual optical ring is shown in FIG. 2. The network, generally referenced 20, comprises a plurality of network nodes 22, labeled R1, R2, R3 and R4 wherein each node is connected to a single concentrator 28 via pairs of optical links. The concentrator is configured internally to simulate a ring architecture while the nodes are connected to it in a star configuration. Internal connections 30, 32 are made so as to create a bi-directional ring comprising an inner ring 26 and an outer ring 24.

An example of such a concentrator commercially available is the Cisco ONS15190 IP Transport Concentrator, manufactured by Cisco Systems Inc., San Jose, Calif., which enables the creation of logical rings over physical star-based fiber topology and permits reordering, insertion or removal of nodes on live rings without requiring a service interruption.

Although, connecting all the network nodes (e.g., routers) to a single concentrator simplifies the physical cabling and connectivity needed to establish a ring network, it creates a point of vulnerability in that the failure of a concentrator causes the entire ring to collapse. In the event of a concentrator failure, the nodes have no alternative link available thus preventing communications. On the other hand, in the event a node fails, the remaining nodes still can communicate.

There is thus a need for a mechanism that permits a plurality of network nodes to continue operating as an optical ring in the event of the failure of the concentrator to which each is connected. Such a mechanism would be able to detect the failure of a concentrator and be able to permit the continued operation of the simulated optical ring. The mechanism should provide alternative links between routers in the event a concentrator fails thereby permitting the continued operation of the ring whereby all the nodes participating in the ring can receive and transmit data. Such a mechanism preferably provides alternative links between nodes regardless of the number of nodes located on the ring.

SUMMARY OF THE INVENTION

One embodiment of the present invention is a concentrator redundancy mechanism for optical ring networks that provides an alternative path for traffic in the event of a failure of a concentrator. The nodes in a network are connected in accordance with the invention to dual concentrators whereby the failure of one of the concentrators is detected and an alternate path formed thus preventing the collapse of the ring. This embodiment has application in any type of ring network environment where the nodes are connected to a centralized network concentrator in a physical star configuration. The embodiment is particularly useful in SONET/SDH optical based ring networks wherein the nodes are connected to a concentrator in a physical star configuration. This improves the reliability of optical rings by enabling the ring to continue to function in the event of a concentrator failure.

In constructing the rings originally, the nodes, each having an A interface and a B interface, are connected to dual concentrators (e.g., concentrators 1 and 2) such that the output of a B interface is always connected to the input of an A interface, starting from the first node. If the nodes are numbered consecutively starting with one, (i.e. R1, R2, etc.) then for every even node (i.e. R2, R4, etc.) the A interface is connected to concentrator 1 and the B interface is connected to concentrator 2. For every odd node (i.e. R1, R3, etc.) the A interface is connected to concentrator 2 and the B interface is connected to concentrator 1. Both concentrators are configured to connect the nodes in daisy chain fashion and to connect the last node to the first node (i.e. interface B of R4 to interface A of R1) thus closing both the inner and outer rings.

The above applies for networks with an even number of nodes. If the number of nodes if odd, an additional pair of optical fibers are connected between the two concentrators in lieu of an additional node that would make the total even.

In the event of a failure of one of the concentrators, all the node interfaces connected to it wrap (i.e. loopback operation). The surviving concentrator detects the concentrator failure and modifies its internal connections such that all the nodes are connected to form a single ring. On the inner ring, interface A output is connected to interface B input on a neighboring node and interface A output of the last node is connected to interface B input of the first node to close the ring.

When the number of nodes in the network is odd, than on the inner ring interface A output is connected to interface B input on a neighboring node and interface A output of the last node is connected to interface B input of the first node. The output interface of the last node is connected to the input interface of the first node to close the ring.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC), Field Programmable Gate Array (FPGA) or functionally equivalent discrete hardware components.

There is therefore provided in accordance with the present invention a failure recovery method in a dual optical ring network including an inner ring and an outer ring, a plurality of nodes, a first concentrator and a second concentrator, wherein each node includes at least an interface A and an interface B each comprising an input interface and an output interface, the method comprising the steps of connecting interface A of every even node and interface B of every odd node to the first concentrator and connecting interface B of every even node and interface A of every odd node to the second concentrator, configuring the first concentrator and the second concentrator so as to connect the plurality of nodes to form bi-directional dual counter-rotating optical rings, in the event of a failure of a concentrator, configuring interfaces in the plurality of nodes connected to the failed concentrator to loopback configuration and configuring the surviving concentrator such that the interfaces of the plurality of nodes are connected in daisy chain fashion so as to form a single optical ring.

There is also provided in accordance with the present invention a method of connecting a plurality of nodes to a first concentrator and a second concentrator to form a dual optical ring network including an inner ring and an outer ring, each node including an interface A and an interface B, the method comprising the steps of: beginning with a first node, configuring the first concentrator and the second concentrator so as to connect interface B of a particular node to interface A of its neighboring node, configuring the first concentrator and the second concentrator so as to connect interface B of the last node with interface A of the first node and in the event the number of nodes is odd, connecting a pair of optical fibers between the first concentrator and the second concentrator in lieu of a node after the last node.

There is further provided in accordance with the present invention a recovery method for use in a dual optical ring network including an inner ring and an outer ring, a plurality of nodes, a first concentrator and a second concentrator, wherein each node includes at least an interface A and an interface B each comprising an input and an output, the method comprising the steps of beginning with a first node, configuring the first concentrator and the second concentrator so as to connect interface B of a particular node to interface A of its neighboring node, configuring the first concentrator and the second concentrator so as to connect interface B of the last node with interface A of the first node, in the event of a failure of a concentrator, configuring interfaces connected to the failed concentrator to loopback operation and on the inner ring, connecting interface A output to interface B input on a neighboring node and connecting interface A output of the last node to interface B input of the first node to close the ring.

There is also provided in accordance with the present invention a recovery method for use in a dual optical ring network including an inner ring and an outer ring, an odd number of nodes, a first concentrator and a second concentrator, wherein each node includes at least an interface A and an interface B each comprising an input and an output, the method comprising the steps of beginning with a first node, configuring the first concentrator and the second concentrator so as to connect interface B of a particular node to interface A of its neighboring node, configuring the first concentrator and the second concentrator so as to connect interface B of the last node with interface A of the first node, connecting a pair of optical fibers between the first concentrator and the second concentrator in lieu of a node after the last node, in the event of a failure of a concentrator, configuring interfaces connected to the failed concentrator to loopback operation, on the inner ring, connecting interface A output to interface B input on a neighboring node and connecting interface A output of the last node to interface B input of the first node and connecting the output interface of the last node to the input interface of the first node to close the ring.

There is further provided in accordance with the present invention a computer program product for use in a concentrator, the computer program product comprising a computer useable medium having computer readable program code means embodied in the medium for recovering from a concentrator failure in a dual optical ring network including an inner ring and an outer ring, a plurality of nodes, a first concentrator and a second concentrator, wherein each node includes at least an interface A and an interface B each comprising an input and an output, computer readable program code means for configuring, beginning with a first node, the first concentrator and the second concentrator so as to connect interface B of a particular node to interface A of its neighboring node, computer readable program code means for configuring the first concentrator and the second concentrator so as to connect interface B of the last node with interface A of the first node, computer readable program code means for connecting, in the event the number of nodes is odd, a pair of optical fibers between the first concentrator and the second concentrator in lieu of a node after the last node, computer readable program code means for configuring interfaces connected to the failed concentrator to loopback operation, in the event of a failure of a concentrator and computer readable program code means for connecting, on the inner ring, interface A output to interface B input on a neighboring node and connecting interface A output of the last node to interface B input of the first node.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
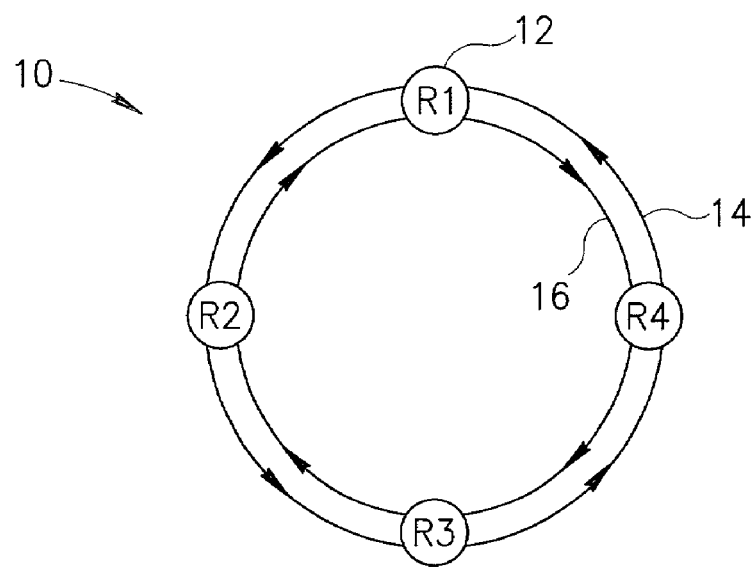
FIG. 1 is a diagram illustrating a prior art example of a dual optical ring network including four nodes.
Figure 2:
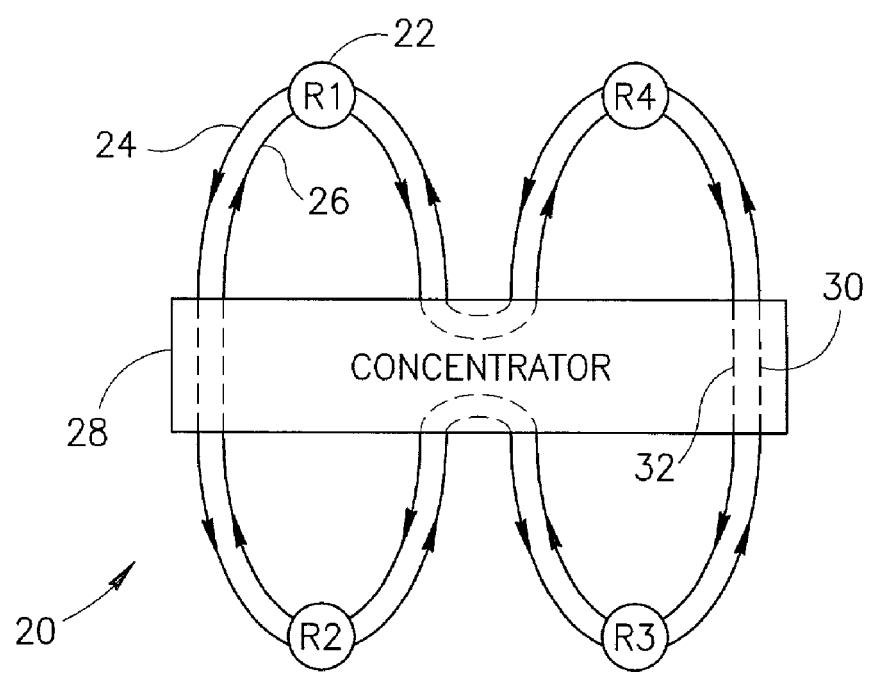
FIG. 2 is a diagram illustrating a prior art example of a plurality of network nodes connected to a concentrator configured to simulate the operation of a dual optical ring.

The following notation is used throughout this document.

| Term | Definition |
| --- | --- |
| ASIC | Application Specific Integrated Circuit |
| CPU | Central Processing Unit |
| CRT | Cathode Ray Tube |
| DSP | Digital Signal Processor |
| EEPROM | Electrically Erasable Programmable Read Only Memory |
| EEROM | Electrically Erasable Read Only Memory |
| EPROM | Electrically Programmable Read Only Memory |
| FPGA | Field Programmable Gate Array |
| IP | Internet Protocol |
| IPS | Intelligent Protection Switching |
| LAN | Local Area Network |
| LCD | Liquid Crystal Display |
| MAC | Media Access Control |
| NIC | Network Interface Card |
| PBX | Private Branch Exchange |
| RAM | Random Access Memory |
| RFC | Request for Comment |
| ROM | Read Only Memory |
| SDH | Synchronous Digital Hierarchy |
| SNMP | Simple Network Management Protocol |
| SONET | Synchronous Optical Network |
| SRP | Spatial Reuse Protocol |
| TCP | Transmission Control Protocol |
| WDM | Wave Division Multiplexing |
| WWW | World Wide Web |

DETAILED DESCRIPTION OF THE INVENTION

The present invention is a concentrator redundancy mechanism for optical ring networks that provides an alternative path for traffic in the event of a failure of a concentrator. The nodes in a network are connected in accordance with the invention to dual concentrators whereby the failure of one of the concentrators is detected and an alternate path formed thus preventing the collapse of the ring. The present invention has application in any type of ring network environment where the nodes are connected to a centralized network concentrator in a physical star configuration. The invention is particularly useful in SONET/SDH optical based ring networks wherein the nodes are connected to a concentrator in a physical star configuration. The invention improves the reliability of optical rings by enabling the ring to continue to function in the event of a concentrator failure.

For illustration purposes, the invention is described in the context of example ring networks. Note, however, that it is not intended that the invention be limited to the examples presented herein. It is appreciated that one skilled in the art can apply the principles of the invention to other network configurations as well.

For purposes of this specification, the term 'network device' and 'network node' shall be taken to mean any physical device within a network used for the purposes of communications such as within a ring network, including but not limited to, a switch, router, hub, exchange, bridge, concentrator, workstation or terminal using any suitable protocol such as Ethernet, SONET, SDH, Token Ring, SRP, TCP, IP, etc. Note that a network device may be implemented in either software, hardware or a combination of both.

The term 'concentrator' shall be taken to mean any physical device within a network used for the purposes of simulating a logical ring architecture from network nodes connected to it in a physical star configuration, including but not limited to, optical ring concentrators, network switching devices, Token Ring concentrators, etc. using any suitable protocol such as Ethernet, SONET, SDH, Token Ring, SRP, TCP, IP, etc. A concentrator may be implemented in either software, hardware or a combination of both.

Figure 3:
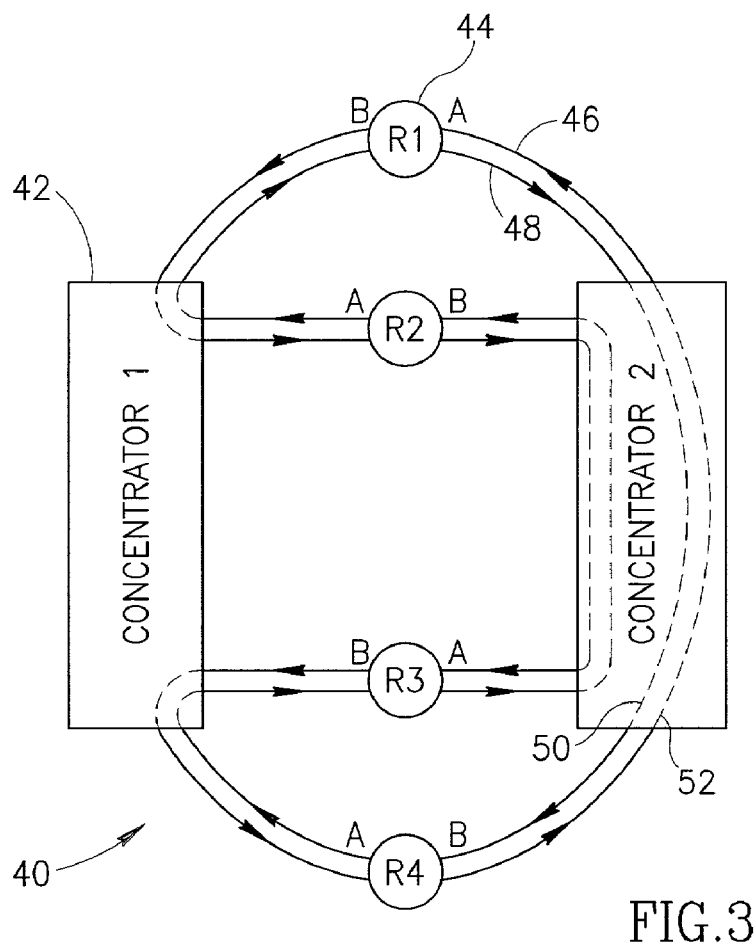
FIG. 3 is a diagram illustrating the connection scheme of an even number of network nodes connected to two concentrators configured to form a dual ring optical network and to provide redundancy in accordance with the present invention.

A diagram illustrating the connection scheme of an even number of network nodes connected to two concentrators configured to form a dual ring optical network and to provide redundancy in accordance with the present invention is shown in FIG. 3. The ring network, generally referenced 40, comprises a plurality of network nodes 44 wherein each node comprises an A interface and a B interface for connection via optical links. Both A and B interfaces comprises input and output connections.

In the example shown herein, the ring network comprises four nodes labeled R1, R2, R3 and R4. Each node is connected to two concentrators 42, labeled concentrator 1 and concentrator 2. The concentrator comprises a plurality of line interface cards each having a plurality of ports. Each node is connected to each concentrator via two links, each link connected to a different physical port. The nodes are connected to the concentrators such that symmetric bi-directional dual counter-rotating rings are formed, including an inner ring 48 and an outer ring 46, wherein each ring handles traffic in a single direction, i.e. clockwise traffic and counterclockwise traffic. In accordance with the invention, both concentrators are adapted to create internal connections 50, 52 to link neighboring nodes together and to close the rings. The internal connections are indicated by the dashed lines within the concentrators.

The concentrator is adapted to emulate a ring structure internally even though the nodes are connected in a physical star configuration. The concentrator performs this function using switching means adapted to forward data from node to node around the ring. Via the switching functions, the concentrator effectively establishes internal connections between the nodes as shown by the dashed connections between interfaces.

The nodes are connected such that the output of an A interface is always connected to the input of a B interface and the output of a B interface is always connected to the input of an A interface. If the nodes are numbered consecutively starting with one, (i.e. R1, R2, etc.) then for every even node (i.e. R2, R4, etc.) the A interface is connected to concentrator 1 and the B interface is connected to concentrator 2. For every odd node (i.e. R1, R3, etc.) the A interface is connected to concentrator 2 and the B interface is connected to concentrator 1. Both concentrators are configured to connect the nodes in daisy chain fashion and to connect the last node to the first node (i.e. interface B of R4 to interface A of R1) thus closing both the inner and outer rings. In this example, concentrator 2 is configured to close the rings. It is appreciated that depending on the particular implementation ring networks having any number of nodes may be constructed in accordance with the present invention.

Figure 4:
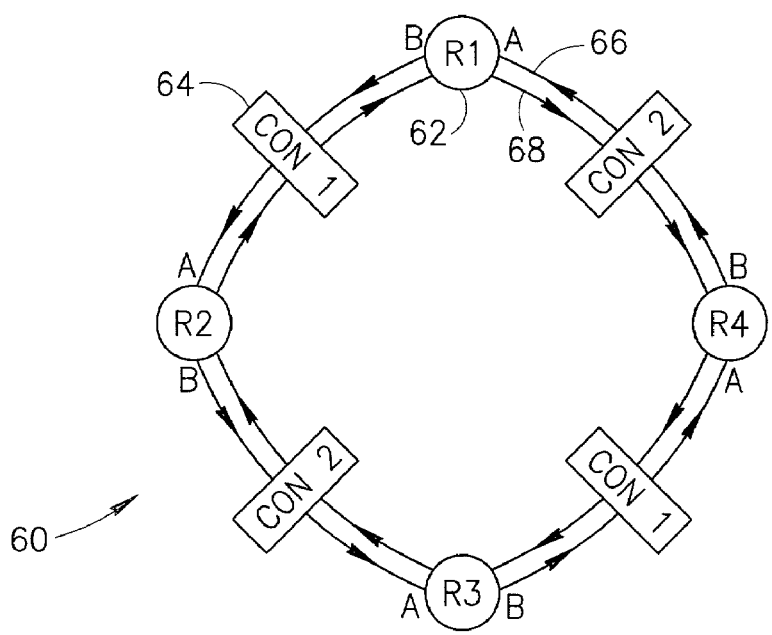
FIG. 4 is a block diagram illustrating the graphical representation of the connection scheme of FIG. 3.

A block diagram illustrating the graphical representation of the connection scheme of FIG. 3 is shown in FIG. 4. The network, generally referenced 60, thus created is depicted without showing the physical connections to the concentrators. For each link 66, 68 between nodes 62, blocks 64 are shown indicating which concentrator is simulating that link, either CON 1 (concentrator 1) or CON 2 (concentrator 2). The A and B interfaces for each node are also shown. Note that each concentrator between nodes follows the rule of connecting interface A to interface B and vice versa. Thus, the concentrators are adapted to establish inner and outer counter-rotating rings permitting communications among the nodes connected thereto.

In accordance with the present invention, a failure of one of the concentrators causes all the node interfaces connected to it to wrap (i.e. loopback operation). The surviving concentrator detects the concentrator failure and modifies its internal connections such that all the nodes are connected to form a single ring. A diagram illustrating the connection scheme of the recovered network of FIG. 3 in the event of a failure of one of the two concentrators is shown in FIG. 5.

In the event of a failure of a concentrator, the network, generally referenced 70, comprises the plurality of nodes 74 connected to the surviving concentrator 72 (concentrator 2).

The plurality of nodes is adapted to detect a concentrator failure and to configure the ports connected to the failed concentrator to wrap 82 or loopback mode of operation. In response to learning of the failure of concentrator 1, concentrator 2 (i.e. the surviving concentrator) reconfigures its internal connections 80 so to form a single ring incorporating all the nodes.

Figure 5:
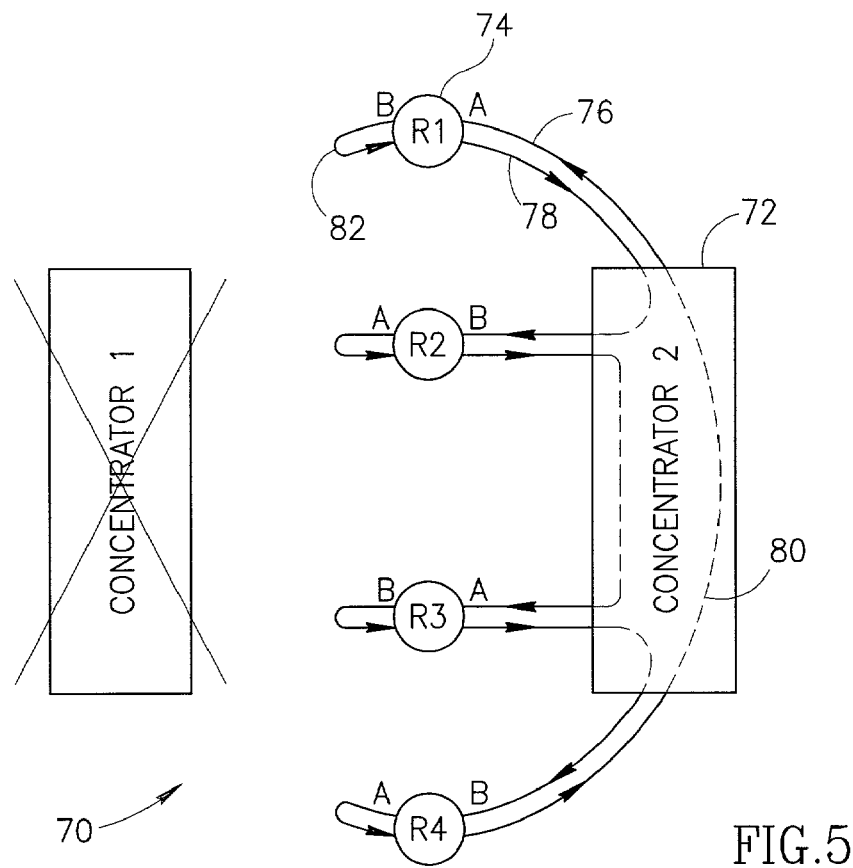
FIG. 5 is a diagram illustrating the connection scheme of the recovered network of FIG. 3 in the event of a failure of one of the two concentrators.
Figure 6:
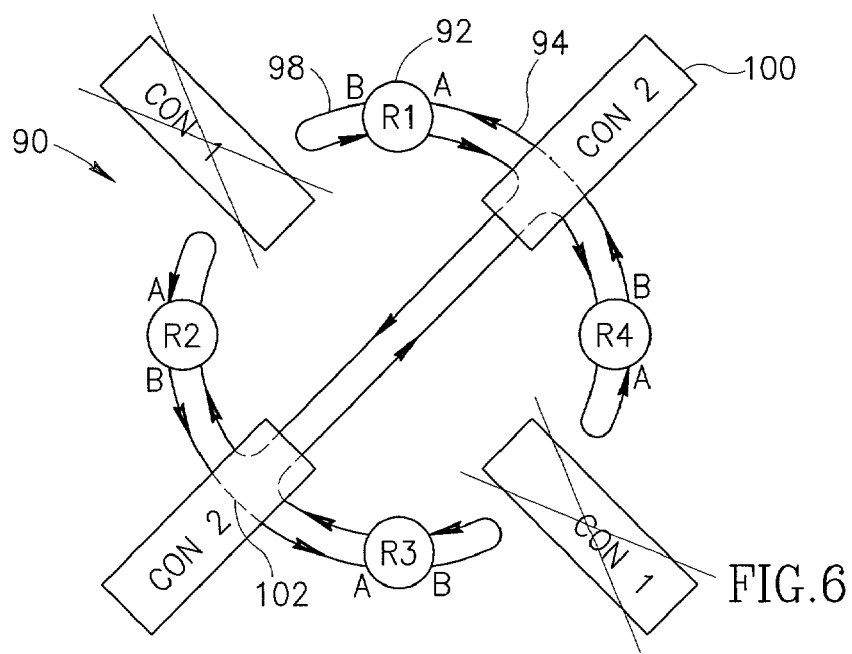
FIG. 6 is a diagram illustrating the graphical representation of the connection scheme of the recovered network of FIG. 5.

A diagram illustrating the graphical representation of the connection scheme of the recovered network of FIG. 5 is shown in FIG. 6. In response to the failure of a concentrator, the network, generally referenced 90, is reconfigured by the surviving concentrator 100 to form a single ring 94 resembling a wheel incorporating all the nodes 92. The concentrator is reconfigured such that internal connections 102 are made to connect the nodes into a single ring. On each node, the interface connected to the failed concentrator is configured as a loopback 98.

Figure 7:
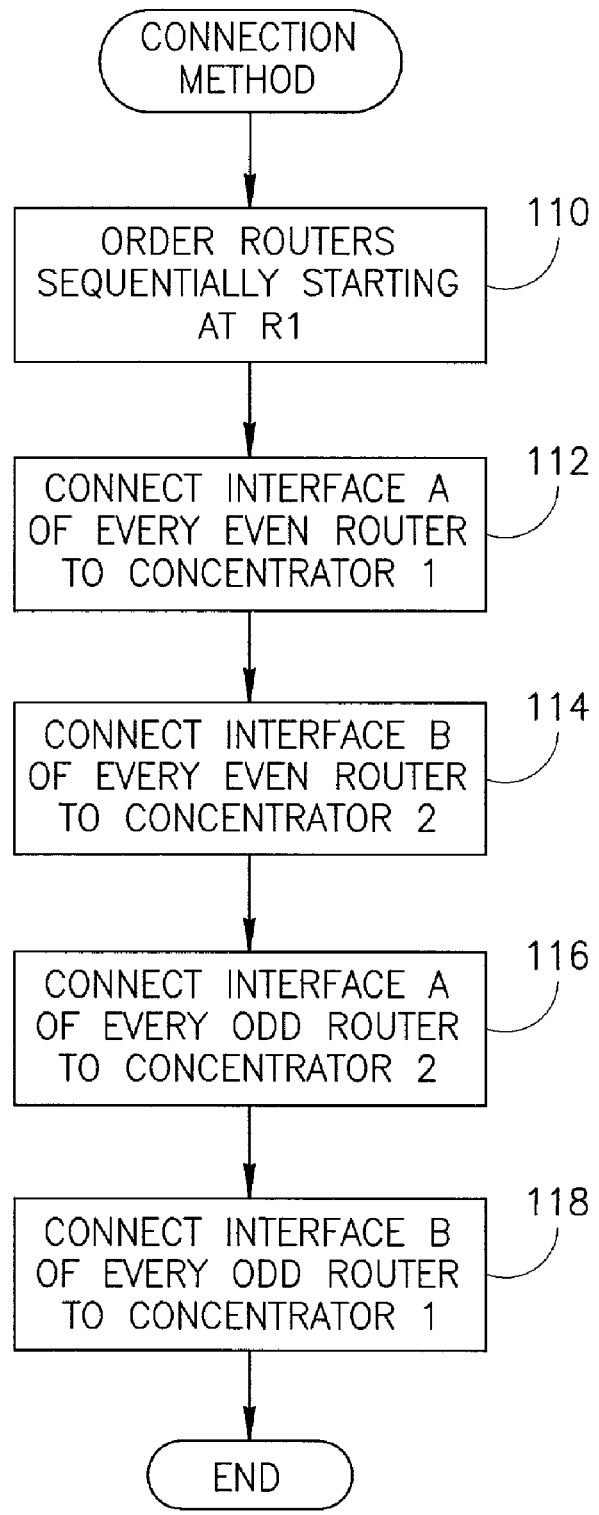
FIG. 7 is a flow diagram illustrating the connection method of the present invention.

The methods of connecting the nodes to the concentrator and of reconfiguring the surviving concentrator in the event of a failure of a concentrator will now be described in more detail. A flow diagram illustrating the connection method of the present invention is shown in FIG. 7. The method requires at least two concentrators, whereby each serves as a redundant concentrator for the other. First, the nodes are numbered sequentially starting from one, e.g., R1, R2, etc. (step 110). Interface A of each even numbered node is connected to concentrator 1 (step 112) while interface B of every even node is connected to concentrator 2 (step 114). Interface A of each odd numbered node is connected to concentrator 2 (step 116) while interface B of every odd node is connected to concentrator 1 (step 118). Thus, in the example network of FIG. 3 assuming there are no failures and starting from R1, an interface B is always connected to an interface A for both inner and outer rings until the rings are closed.

Figure 8:
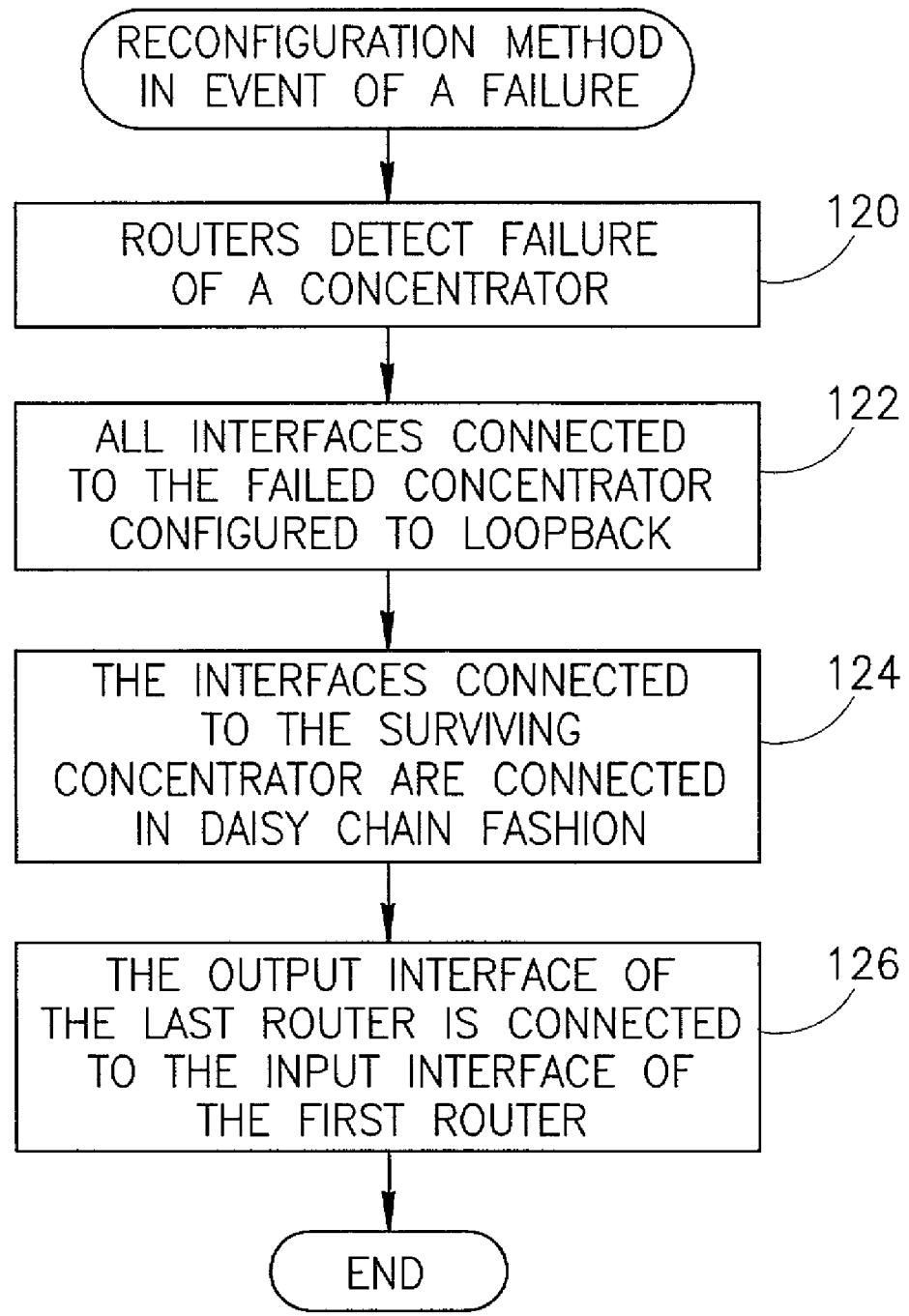
FIG. 8 is a flow diagram illustrating the reconfiguration method of the present invention executed in the event of a failure of a concentrator.

A flow diagram illustrating the reconfiguration method of the present invention executed in the event of a failure of a concentrator is shown in FIG. 8. First, the nodes detect the failure of a concentrator (step 120). At each node, all interfaces connected to the failed concentrator are configured for loopback operation (i.e. wrapped) (step 122). At each node, the interfaces connected to the surviving concentrator are connected in daisy chain fashion (step 124). On the inner ring, interface A output is connected to interface B input on a neighboring node and interface A output of the last node is connected to interface B input of the first node to close the ring (step 126).

The mechanism of the present invention may be implemented in either hardware or software or a combination of both. Since the concentrator already comprises the capability of making multiple connections between optical fibers, the modifications required to implement the mechanism are not extensive. Further, reconfiguration of the internal connections in the event of a concentrator failure can be easily performed since the concentrators already have knowledge of the topology of the rings derived from information input by the user at the time the ring was constructed.

The detection of the failure by the surviving concentrator may be achieved either directly or indirectly. A direct communication link between the concentrators may be used whereby the cessation of receipt of keep alive messages serves as the determination that a concentrator failed. In the indirect approach, the nodes detect that the concentrator failed, configures loopback on those interfaces connected to the failed concentrator and in SRP based networks, begins to transmit SRP Long IPS messages advertising the failure to all the nodes around the ring. The concentrator, adapted to examine the traffic passing through it, detects the advertised messages, concludes that the other concentrator has failed and reconfigures its internal connections in response thereto.

Spatial Reuse Protocol (SRP) uses a bidirectional dual counter-rotating ring topology whereby both rings are concurrently utilized for transporting data and SRP control packets. SRP control packets handle tasks such as topology discovery, protection switching and bandwidth control. Control packets propagate in the opposite direction from the corresponding data packets. Thus, for data packets being transported by the outer ring, control packets are transported by the inner ring. SRP, as defined in RFC 2891, is a media-independent Media Access Control (MAC)-layer protocol that operates over a dual-ring network topology. It transports IP packets at multigigabit speeds over long transmission distances, while providing support for bandwidth and node number scalability and packet survivability. The SRP MAC provides the base functionality for addressing, packet stripping, bandwidth control and control message propagation on the packet ring. Because SRP is media independent, it can be used over a wide array of underlying physical-layer technologies. SRP provides an efficient use of bandwidth by having the destination node remove the packet after it is received. This frees bandwidth for utilization by other packets.

The use of dual fiber-optic rings provides a high level of survivability. If a node fails or a break in any of the connecting cables occurs, data is rerouted over the alternate ring. Products developed using SRP technology successfully combine the advantages of IP networking (bandwidth efficiency and rich services) with the self-healing capabilities of fiber rings. SRP rings are media independent and can operate over a variety of underlying technologies, including Synchronous Optical Network/Synchronous Digital Hierarchy (SONET/SDH), wavelength-division multiplexing (WDM) and dark fiber.

The interface wrap mechanism required by the method of the invention may be provided by the Intelligent Protection Switching (IPS) built into SRP Rings. In operation, IPS implemented on each node allows the ring to automatically and rapidly recover from a fiber facility or node failure by wrapping traffic around the failure. Nodes adjacent to the failure wrap the ring to restore the ring from the failure. The intermediate nodes then pass through data and IPS control packets to their intended destinations. Normally, packets flow from node A to node B by taking a one-hop path. Assuming there is a fiber cut between a neighboring nodes, both nodes utilize IPS to wrap the ring. Then packets from nodes A and B take a multi-hop path wherein each intermediate node receiving the packet uses the fact that the packet header has the ring-ID of the opposite ring and forwards the packet on via the transit buffer. When the packet is wrapped back onto the outer ring by node B, its destination is stripped.

In order for the mechanism of the present invention to operate, the nodes in the network must be able to (1) perform automatic loopback whereby the connections to the failed concentrator are wrapped automatically, (2) advertise the concentrator failure to other nodes (assuming indirect detection) and (3) support the 'wheel' configuration described supra allowing the node to continue sending traffic using the new internal concentrator connections.

Figure 9:
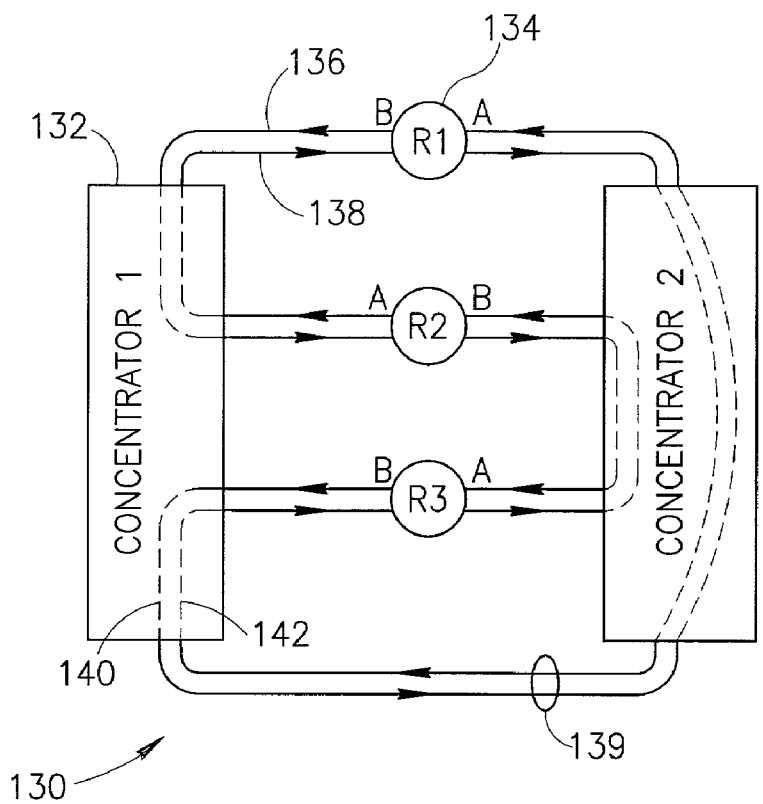
FIG. 9 is a diagram illustrating the connection scheme of an odd number of network nodes connected to two concentrators configured to form a dual ring optical network and to provide redundancy in accordance with the present invention.

A diagram illustrating the connection scheme of an odd number of network nodes connected to two concentrators configured to form a dual ring optical network and to provide redundancy in accordance with the present invention is shown in FIG. 9. The mechanism described supra is valid when the total of nodes is even. In the event the total number of nodes is odd, an additional pair of optical fibers is connected between concentrator 1 and concentrator 2 in lieu of a node after the last node in order to close the rings through the concentrators.

The network, generally referenced 130, is similar to that of FIG. 3 with the difference being that R4 is replaced by a pair of optical fibers. The odd number of nodes 134 is connected in the same way as that described above with the pair of optical fibers 139 added connected between concentrator 1 and concentrator 2. As described supra, both concentrators 132 are configured to create internal connections 142 to connect interface B to interface A starting from node R1. Interface B of node R3 is connected to interface A of node R1 via optical fiber pair 139 and internal connections in concentrator 2.

Figure 10:
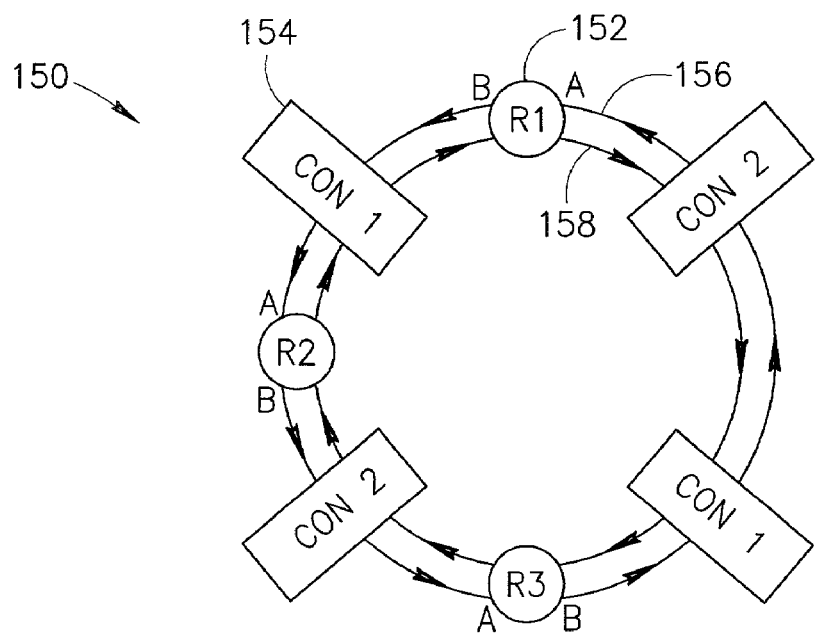
FIG. 10 is a block diagram illustrating the graphical representation of the connection scheme of FIG. 9.

A block diagram illustrating the graphical representation of the connection scheme of FIG. 9 is shown in FIG. 10. The network, generally referenced 150, comprises a plurality of nodes 152, inner ring 158, outer ring 156 and concentrator 154. In this example network, an odd number of nodes (e.g., 3), labeled R1, R2, R3, are connected to form bi-directional dual counter-rotating rings.

Figure 11:
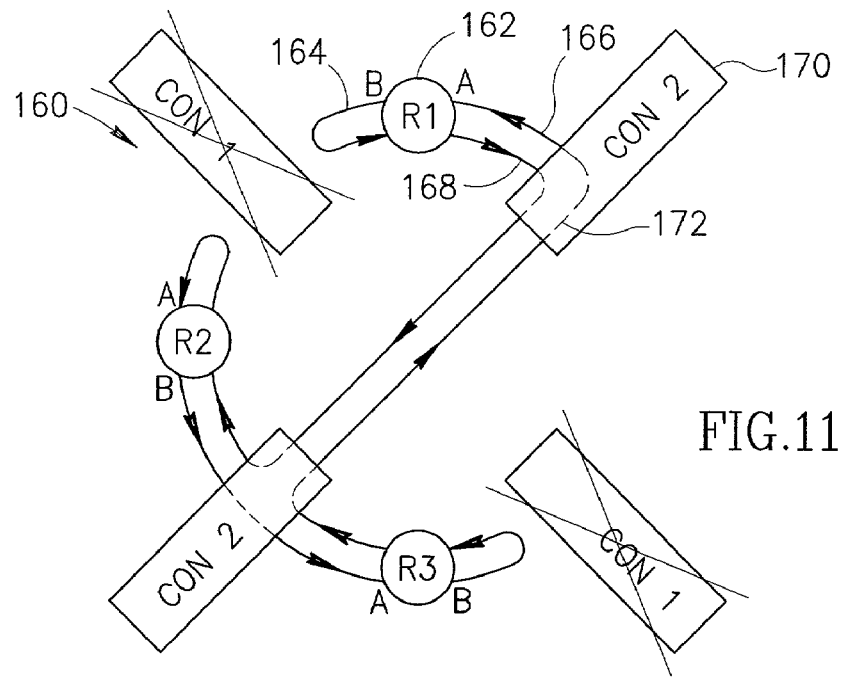
FIG. 11 is a diagram illustrating the graphical representation of the connection scheme of the recovered network of FIG. 9 in the event of a failure of one of the two concentrators.

In the event of a failure of one of the concentrators, the surviving concentrator is adapted to reconfigure its internal connections to form a single ring that includes all the nodes on the original ring, as shown in FIG. 11. The network, generally referenced 160, comprises the three nodes 162 whose interfaces connected to the failed concentrator are configured in loopback 164 and the surviving concentrator 170. The inner ring 168 and outer rings 166 are now connected by the loopbacks and all the nodes are connected to form a ring.

In particular, on the inner ring, interface A output is connected to interface B input on a neighboring node and interface A output of the last node is connected to interface B input of the first node. In addition, the output interface of the last node is connected to the input interface of the first node.

Figure 12:
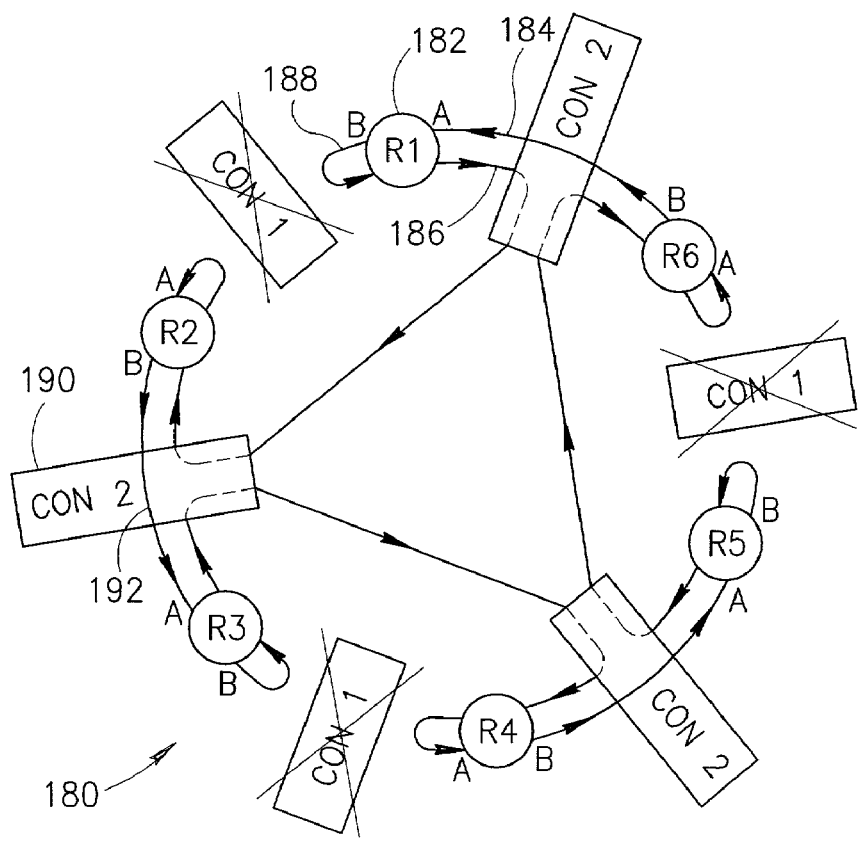
FIG. 12 is a diagram illustrating the graphical representation of the connection scheme of a recovered network comprising six network nodes in the event of a failure of one of the two concentrators.

The connection scheme in the event of a concentrator failure for an example network comprising six nodes and two concentrators is presented. A diagram illustrating the graphical representation of the connection scheme of a recovered network comprising six network nodes in the event of a failure of one of the two concentrators is shown in FIG. 12. The network, generally referenced 180, comprises six nodes 182, labeled R1 through R6 and two concentrators 190 connected to the nodes via pairs of optical fibers.

The network is constructed in accordance with the connection method of FIG. 7 wherein, starting from R1, interface B is connected to interface A of the subsequent node (e.g., links 184, 186). The last node connected to the first node via internal connection 192 in concentrator 2 (dashed lines). In the event of a failure of concentrator 1, the reconfiguration method of FIG. 8 is applied. The interfaces connected to the failed concentrator are configured to loopback 188 while the internal connections in concentrator 2 are reconfigured such that on said inner ring, interface A output is connected to interface B input on a neighboring node and interface A output of the last node (i.e. R6) is connected to interface B input of the first node (i.e. R1).

Note that it is not intended that the scope of the invention be limited to the examples presented herein, as networks with a number of concentrators larger than two may be constructed utilizing the mechanisms of the present invention.

In alternative embodiments, the present invention may be applicable to implementations of the invention in integrated circuits or chip sets, e.g., Application Specific Integrated Circuits (ASICs), Field Programmable Gate Arrays (FPGAs), etc., wireless implementations, switching system products and transmission system products, e.g., SONET/SDH based products. For the purpose of this document, the term switching systems products shall be taken to mean private branch exchanges (PBXs), central office switching systems that interconnect subscribers, toll/tandem switching centers and broadband core switches located at the center of a service provider's network that may be fed by broadband edge switches or access multiplexers and associated signaling and support system services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

COMPUTER EMBODIMENT

Figure 13:
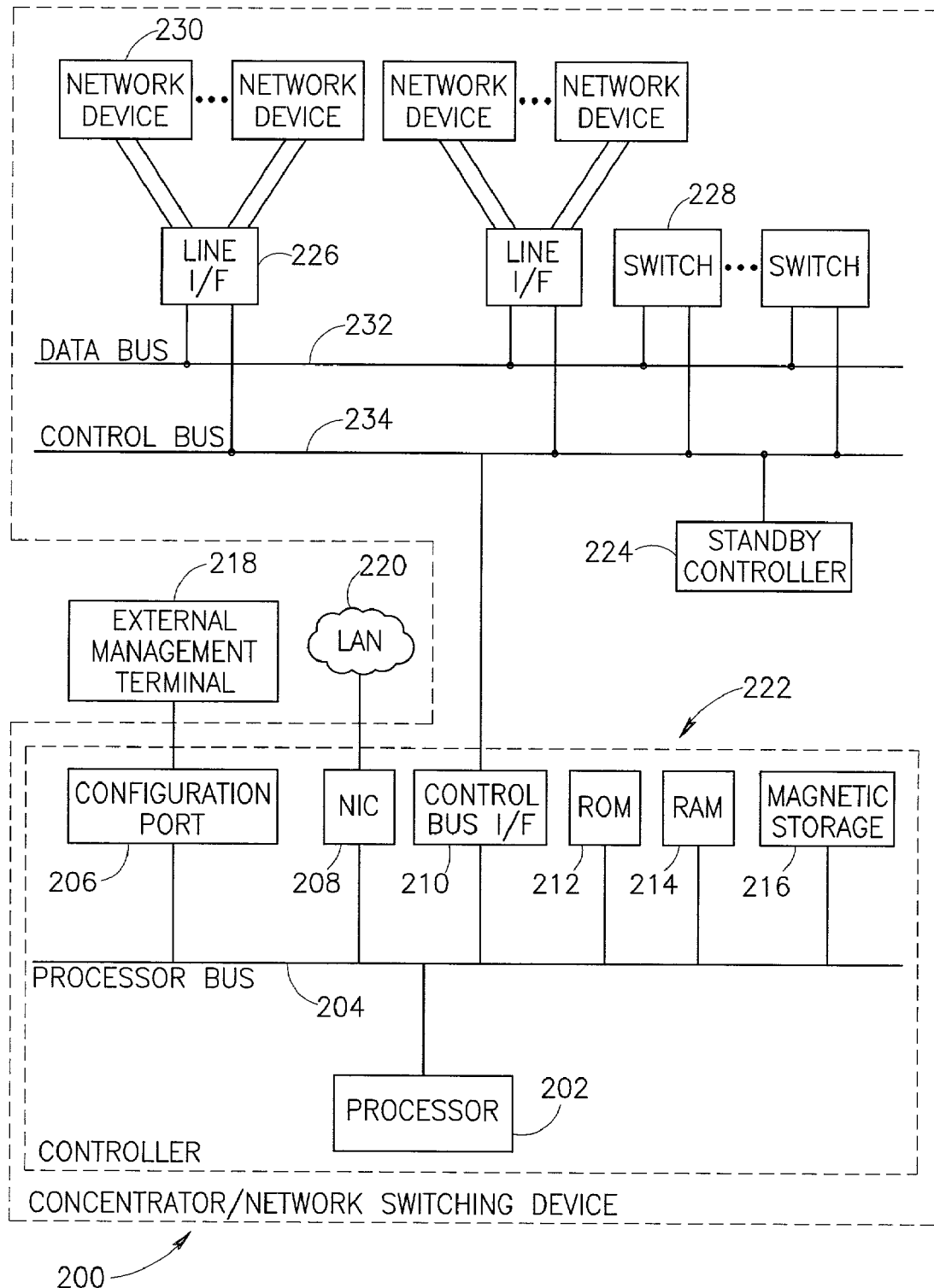
FIG. 13 is a block diagram illustrating an example computer processing system adapted to perform the concentrator redundancy method of the present invention.

In another embodiment, a computer is operative to execute software adapted to perform the concentrator redundancy mechanism of the present invention. A block diagram illustrating an example computer processing system adapted to perform the concentrator redundancy mechanism of the present invention is shown in FIG. 13. The mechanism, part of which is implemented in software, is intended to incorporated within the concentrators or network switching devices in the network.

The computer system, generally referenced 200, comprises a primary controller 222 and a standby controller 224 coupled to a control bus 234. The controllers are in communication with a number of components including one or more line interface cards 226 and one or more switch cards 228. Each line interface card is connected to a plurality of network devices/nodes 230 via ports on line interface cards over dual links for each network device. The line interface cards provide the PHY layer for the nodes connected to the system. The switching function is provided by the one or more switch cards. The line interface cards and the switch cards both communicate over the control bus 234 and the data bus 232.

The controller 222 comprises a processor 202 which may be implemented as a microcontroller, microprocessor, microcomputer, ASIC core, Field Programmable Gate Array (FPGA), central processing unit (CPU) or digital signal processor (DSP). The controller further comprises static read only memory (ROM) 212, dynamic main memory (RAM) 214 and magnetic memory 216 all in communication with the processor via one or more processor buses 204.

The processor is also in communication via the processor bus with a number of peripheral devices that are also included in the computer system. A configuration port 206 provides access to operation, administration and management features via an external management terminal 218. The terminal communicates with the controller via any suitable means including, for example, serial means such as RS-232, via Ethernet, via the world wide web (WWW) of the Internet, etc. A network interface card (NIC) 208 functions to connect the system to a Local Area Network (LAN) 220 which may also be used for monitoring, i.e. SNMP, etc. and management functions.

The controller may be suitably programmed to implement an optional host interface in addition to the configuration port for communicating with a host computing device in the system. The host may be adapted to configure, control and maintain the operation of the system.

The controller is adapted to implement a user interface via any suitable port such as, for example, the configuration port or NIC port. The user interface is adapted to respond to user inputs and provides feedback and other status information. The user interface may comprise peripheral devices (not shown) that may be optionally added such as a video display, which may comprise a Cathode Ray Tube (CRT) or Liquid Crystal Display (LCD), alphanumeric input device such as a keyboard, a cursor control device (i.e. pointing device) such as a mouse or tablet and a signal generation device such as an audio speaker system.

The magnetic storage device may be adapted to store application programs and data depending on the requirements of the particular implementation. The system comprises computer readable storage medium that may include any suitable memory means including but not limited to magnetic storage, optical storage, semiconductor volatile or non-volatile memory, biological memory devices or any other memory storage device.

The software for implementing the concentrator redundancy mechanism of the present invention is adapted to reside on a computer readable medium, such as a magnetic disk within a disk drive unit. Alternatively, the computer readable medium may comprise a floppy disk, Flash memory card, EEROM, EPROM or EEPROM based memory, bubble memory storage, ROM storage, etc. The software adapted to perform the concentrator redundancy mechanism of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs) and other communication or networking system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A failure recovery method in a dual optical ring network including an inner ring and an outer ring, a plurality of nodes, a first concentrator and a second concentrator, wherein each node includes at least an interface A and an interface B each comprising an input interface and an output interface, said method comprising the steps of:

connecting interface A of every even node and interface B of every odd node directly to said first concentrator and connecting interface B of every even node and interface A of every odd node directly to said second concentrator;

configuring said first concentrator and said second concentrator so as to connect said plurality of nodes to form two counter-rotating optical rings;

in the event of a failure of a concentrator, configuring interfaces in said plurality of nodes connected to the failed concentrator to loopback configuration; and configuring said surviving concentrator such that the interfaces of said plurality of nodes are connected in daisy chain fashion so as to form a single optical ring.

2. The method according to claim 1, said plurality of nodes comprises a plurality of routers.

3. The method according to claim 1, said plurality of nodes comprises a plurality of routers adapted to run Spatial Reuse Protocol (SRP) and Intelligent Protection Switching (IPS) protocol.

4. The method according to claim 1, said first concentrator and said second concentrator are adapted to run Spatial Reuse Protocol (SRP) and Intelligent Protection Switching (IPS) protocol.

5. The method according to claim 1, said plurality of nodes are adapted to detect a failure of either said first concentrator or said second concentrator.

6. The method according to claim 1, further comprising the step of detecting the failure of either said first concentrator or said second concentrator, and in response thereto sending Spatial Reuse Protocol (SRP) Long Intelligent Protection Switching (IPS) protocol compatible packets advertising said failure.

7. The method according to claim 1, wherein in the event the number of nodes is even, an equal number of A interfaces and B interfaces are connected to said first concentrator and said second concentrator.

8. The method according to claim 1, wherein in the event the number of nodes is odd, connecting an optical fiber to said first concentrator and second concentrator and configuring said first concentrator and second concentrator so as to close the inner ring and outer ring.

9. A method of connecting a plurality of nodes to a first concentrator and a second concentrator to form a dual optical ring network including an inner ring and an outer ring, each node including an interface A and an interface B, said method comprising the steps of:

connecting interface A of every even node and interface B of every odd node directly to said first concentrator and connecting interface B of every even node and interface A of every odd node directly to said second concentrator;

configuring said first concentrator and said second concentrator so as to connect said plurality of nodes to form two counter-rotating optical rings; and in the event the number of nodes is odd, connecting a pair of optical fibers between said first concentrator and said second concentrator in lieu of a node;

in the event of a failure of a concentrator, configuring interfaces in said plurality of nodes connected to the failed concentrator to loopback configuration; and configuring said surviving concentrator such that the interfaces of said plurality of nodes are connected to form a single optical ring.

10. The method according to claim 9, said plurality of nodes comprises a plurality of routers.

11. The method according to claim 9, said plurality of nodes comprises a plurality of routers adapted to run Spatial Reuse Protocol (SRP) and Intelligent Protection Switching (IPS) protocol.

12. The method according to claim 9, said first concentrator and said second concentrator adapted to run Spatial Reuse Protocol (SRP) and Intelligent Protection Switching (IPS) protocol.

13. A recovery method for use in a dual optical ring network including an inner ring and an outer ring, a plurality of nodes, a first concentrator and a second concentrator, wherein the plurality of nodes includes a first node, a second node and a last node and wherein each node includes at least an interface A and an interface B each comprising an input and an output, said method comprising the steps of:

connecting interface B of the first node and interface A of the second node directly to the first concentrator;

connecting interface A of the first node and interface B of the second node directly to the second concentrator;

beginning with the first node, configuring said first concentrator and said second concentrator so as to connect interface B of a particular node to interface A of its neighboring node;

configuring said first concentrator and said second concentrator so as to connect interface B of the last node with interface A of said first node;

in the event of a failure of a concentrator, configuring interfaces connected to the failed concentrator to loopback operation; and on said inner ring, directly connecting interface A output to interface B input on a neighboring node through the remaining concentrator and directly connecting interface A output of the last node to interface B input of the first node through the remaining concentrator to close the ring.

14. The method according to claim 13, said plurality of nodes comprises a plurality of routers.

15. The method according to claim 13, said plurality of nodes comprises a plurality of routers adapted to run Spatial Reuse Protocol (SRP) and Intelligent Protection Switching (IPS) protocol.

16. The method according to claim 13, said first concentrator and said second concentrator adapted to run Spatial Reuse Protocol (SRP) and Intelligent Protection Switching (IPS) protocol.

17. The method according to claim 13, said plurality of nodes are adapted to detect a failure of either said first concentrator or said second concentrator.

18. The method according to claim 13, further comprising the step of detecting the failure of either said first concentrator or said second concentrator, and in response thereto sending Spatial Reuse Protocol (SRP) Long Intelligent Protection Switching (IPS) protocol compatible packets advertising said failure.

19. The method according to claim 13, wherein in the event the number of nodes is even, an equal number of A interfaces and B interfaces are connected to said first concentrator and said second concentrator.

20. The method according to claim 13, wherein in the event the number of nodes is odd, connecting an optical fiber to said first concentrator and second concentrator and configuring said first concentrator and second concentrator so as to close the inner ring and outer ring.

21. A recovery method for use in a dual optical ring network including an inner ring and an outer ring, an odd number of nodes, a first concentrator and a second concentrator, wherein the plurality of nodes includes a first node, a second node and a last node and wherein each node includes at least an interface A and an interface B each comprising an input and an output, said method comprising the steps of:

connecting interface B of the first node and interface A of the second node directly to the first concentrator;

connecting interface A of the first node and interface B of the second node directly to the second concentrator;

beginning with the first node, configuring said first concentrator and said second concentrator so as to connect interface B of a particular node to interface A of its neighboring node;

configuring said first concentrator and said second concentrator so as to connect interface B of the last node with interface A of said first node;

connecting a pair of optical fibers between said first concentrator and said second concentrator in lieu of a node after the last node;

in the event of a failure of a concentrator, configuring interfaces connected to the failed concentrator to loopback operation;

on said inner ring, directly connecting interface A output to interface B input on a neighboring node through the remaining concentrator and directly connecting interface A output of the last node to interface B input of the first node through the remaining concentrator; and directly connecting the output interface of the last node to the input interface of the first node through the remaining concentrator to close the ring.

* * * * *